United States Patent
Mai

(10) Patent No.: US 7,284,979 B2
(45) Date of Patent: *Oct. 23, 2007

(54) SELF ALIGNING ARTICULATED JOINT FOR USE IN A HOT RUNNER SYSTEM

(75) Inventor: Arnold Mai, Irrel (DE)

(73) Assignee: Husky Injection Molding Systems Ltd., Bolton, Ontario (CA)

(*) Notice: Subject to any disclaimer, the term of this patent is extended or adjusted under 35 U.S.C. 154(b) by 269 days.

This patent is subject to a terminal disclaimer.

(21) Appl. No.: 10/966,709

(22) Filed: Oct. 15, 2004

(65) Prior Publication Data

US 2006/0083814 A1    Apr. 20, 2006

(51) Int. Cl.
*B29C 45/17* (2006.01)

(52) U.S. Cl. ........................ 425/569; 425/567

(58) Field of Classification Search ........... 425/562, 425/567, 569, 572, 573
See application file for complete search history.

(56) References Cited

U.S. PATENT DOCUMENTS

| | | | |
|---|---|---|---|
| 3,718,166 A | | 2/1973 | Gordon |
| 3,934,626 A | * | 1/1976 | Hall ............................ 141/117 |
| 4,243,362 A | | 1/1981 | Rees et al. |
| 4,299,791 A | * | 11/1981 | Aoki ........................ 264/328.9 |
| 4,444,711 A | | 4/1984 | Schad |
| 4,702,689 A | | 10/1987 | Schmidt et al. |
| 4,917,595 A | * | 4/1990 | Nakamura et al. ........... 425/567 |
| 5,484,275 A | * | 1/1996 | Kushnir ....................... 425/190 |
| 5,522,720 A | | 6/1996 | Schad |
| 5,540,580 A | | 7/1996 | Takada |
| 6,106,275 A | * | 8/2000 | Huff et al. ................... 425/563 |

FOREIGN PATENT DOCUMENTS

| | | |
|---|---|---|
| JP | 61-121912 | 6/1986 |
| WO | WO 99/36244 A1 | 7/1999 |
| WO | WO 02/22340 A1 | 3/2002 |

OTHER PUBLICATIONS

International Search Report for PCT/CA2005/001497, dated Jan. 19, 2006, four pages, related to the above-identified US patent application.

* cited by examiner

*Primary Examiner*—Yogendra N. Gupta
*Assistant Examiner*—Emmanuel S. Luk

(57) ABSTRACT

An injection molding self aligning articulated joint configured to be disposed between an injection unit and a hot runner. A joint is provided having first and second spherical surfaces and a melt channel therein. The joint is coupled to one of the injection unit and the hot runner. First and second concave pads are provided to as to be respectively in contact with the first and second spherical surfaces. The first and second concave pads are configured to be movable with respect to the first and second spherical surfaces. At least one of the first and second concave pads is coupled to the other one of the injection unit and the hot runner.

7 Claims, 6 Drawing Sheets

SELF ALIGNING ARTICULATED JOINT FOR USE IN A HOT RUNNER SYSTEM

BACKGROUND OF THE INVENTION

1. Field of the Invention

The present invention relates to an improved injection molding apparatus and method whereby a self aligning articulated coupling allows molten material to be transmitted between an injection unit and a hot runner system in a movable mold component, in order to accommodate the slight movements between the injection unit and the hot runner system caused by thermal elongation of the heated components as well as due to ambient molding conditions.

2. Description of Related Art

In some injection molding applications, the material being molded may lose desired properties if it is exposed to oxygen during molding processes, such as, for example, by parts disconnecting at the interface between the injection unit and the hot runner system. Consequently, in these applications there is a need for the injection unit of the molding machine, in which the material is plasticized, to be continuously sealed to the hot runner system of the mold that is distributing the material to the mold cavity or cavities. It is also desirable for the injection unit to remain directly connected and sealed to the mold or machine's movable section (containing the material infeeding port) throughout the mold's traveling portion of the molding cycle. This is especially true in some multi-material injection molding applications where one of the injection units moves with the movable portion of the mold. This movement, together with ambient molding conditions such as vibration, heat cycling, metal fatigue, etc., may cause damage at the interface between the injection unit and the hot runner system, leading to a leak of melt under high pressure.

U.S. Pat. No. 4,243,362 to Rees and U.S. Pat. No. 4,444,711 to Schad both disclose multi-material turret injection molding machines having one of their two injection units mounted on the machine's movable platen and directly connected to that portion of the mold that is mounted to the movable platen with a conventional sealing nozzle/bush interface. The nozzle remains sealed and connected to the mold infeeding port throughout the molding cycle by virtue of the injection unit being mounted on top of the moving platen and traveling therewith.

Japanese Publication 61-121912 to Shoichi discloses a multi-material injection molding machine having two injection units that connect to hot runners mounted within intermediate movable platens via nozzles. There is no disclosure that the injection units remain sealed to the hot runners throughout the molding cycle. However, it can be inferred from the figures that if the injection units do not maintain a sealed connection throughout the molding cycle they must move into and out of a sealing engagement with hot runners so that sufficient clearance can be provided to allow the movable platens to move when the molds open.

PCT publication WO 99/36244 to Rivi, discloses an injection unit mounted on a mold and maintaining a sealed connection to the mold's infeeding port throughout the molding cycle.

PCT publication WO 02/22340 to Schuett discloses an injection molding machine having a single injection unit slidably mounted alongside and parallel to the clamp mechanism that is releasably sealed to the molds' infeeding ports by a cylinder that also maintains the sealed relationship throughout the molding cycle. The cylinder disconnects the injection unit from the molds' infeeding ports and repositions the injection unit into a special location for purging. There is no disclosure of any sealing features or self aligning features of the injection unit.

U.S. Pat. No. 3,718,166 to Gordon discloses an injection molding machine with multiple nozzles that are pivotably mounted in a manifold. Each nozzle body includes a spherical mounting in the manifold to allow it to pivot with respect to its alignment with the manifold. Although springs are used to urge the nozzles toward the mold interface, there is no disclosure of springs being used to urge the mating halves of the spherical seats toward the spherical feature on the nozzle bodies. An adjusting screw is used to perform this function and thereby provides no automatic adjustability. Thus, at various operating temperatures, differing amounts of thermal expansion in the components provide the potential for material leakage or moving part seizing at the spherical interface with the melt channel.

U.S. Pat. No. 4,702,689 to Schmidt discloses a pivotable hot runner nozzle that can be rotationally oriented to align with a mold cavity surface while maintaining a sealed connection to the hot runner manifold. Once the nozzle has been manually aligned, it is clamped in position and it can no longer re-align with any subsequent movement of the components.

U.S. Pat. No. 5,540,580 to Takada discloses a hot runner connection to a machine nozzle having a rotatable connection through which the melt channel passes. There is no disclosure of the injection unit being connected by bolts or the like to the hot runner, and therefore the motion of the hot runner would not cause the injection unit to follow.

Thus, what is needed is a self-aligning injection apparatus and method that will allow an injection unit to remain reliably sealed to the hot runner system in a movable mold section throughout the mold's traveling portion of the molding cycle, and is easy to install, maintain, and service.

SUMMARY OF THE INVENTION

It is an advantage of the present invention to provide a self aligning articulated injection molding coupling which allows the melt to be transmitted between the injection unit and the hot runner system in a movable mold component.

According to the present invention, a unique combination of structure and/or steps is provided for an injection molding self aligning articulated joint configured to be disposed between an injection unit and a hot runner.

According to a first aspect of the present invention, a unique combination of structure and/or steps is provided for an injection molding hot runner system having an injection unit configured to provide a molten material. A hot runner is configured to provide the injected molten material to a mold. An articulated joint is disposed between the injection unit and the hot runner, and is configured to permit movement therebetween. The articulated joint has: (i) a melt channel configured to provide the injected melt to the hot runner; (ii) a first spherical surface in contact with a first concave pad; and (iii) a second spherical surface in contact with a second concave pad, the spherical surfaces being coupled to one of the hot runner and the injection unit, and the concave pads being coupled to the other one of the hot runner and the injection unit and wherein the injection unit is configured to move with respect to rails, and further comprising a plurality of flexible pads (i) configured to be disposed between said injection unit and the rails, and (ii) configured to avoid overloading and damage on a second injection unit and the rails caused by misalignment due to thermal elongation of heated components and/or incorrect setup/leveling.

According to a third aspect of the present invention, a unique combination of steps is provided for a method of coupling an injection unit and a hot runner in an injection molding device. An articulated joint is disposed between the injection unit and the hot runner. Preferably, the articulated joint includes first and second spherical surfaces which are configured to be respectively movable with respect to first and second concave pads. The articulated joint is coupled to one of the hot runner and the injection unit, and the first and second concave pads are coupled to the other one of the hot runner and the injection unit.

BRIEF DESCRIPTION OF THE DRAWINGS

Exemplary embodiments of the presently preferred features of the present invention will now be described with reference to the accompanying drawings.

DETAILED DESCRIPTION OF THE PRESENTLY PREFERRED EXEMPLARY EMBODIMENTS

1. Introduction

The present invention will now be described with respect to several embodiments in which a plastic injection molding machine injects two different plastic melts into a mold through two different hot runner systems. The second injection unit is mounted to the movable portion of the mold, and thus is supplied with the second plastic melt through an articulated coupling which maintains a good seal throughout its operating environment. However, the present invention will also find applicability in any injection molding process (such as thixomolding, injection-blow molding and injection-compression molding which may benefit from being able to provide a melt through an articulated coupling.

2. The Structure of the Preferred Embodiment

Figure 1:
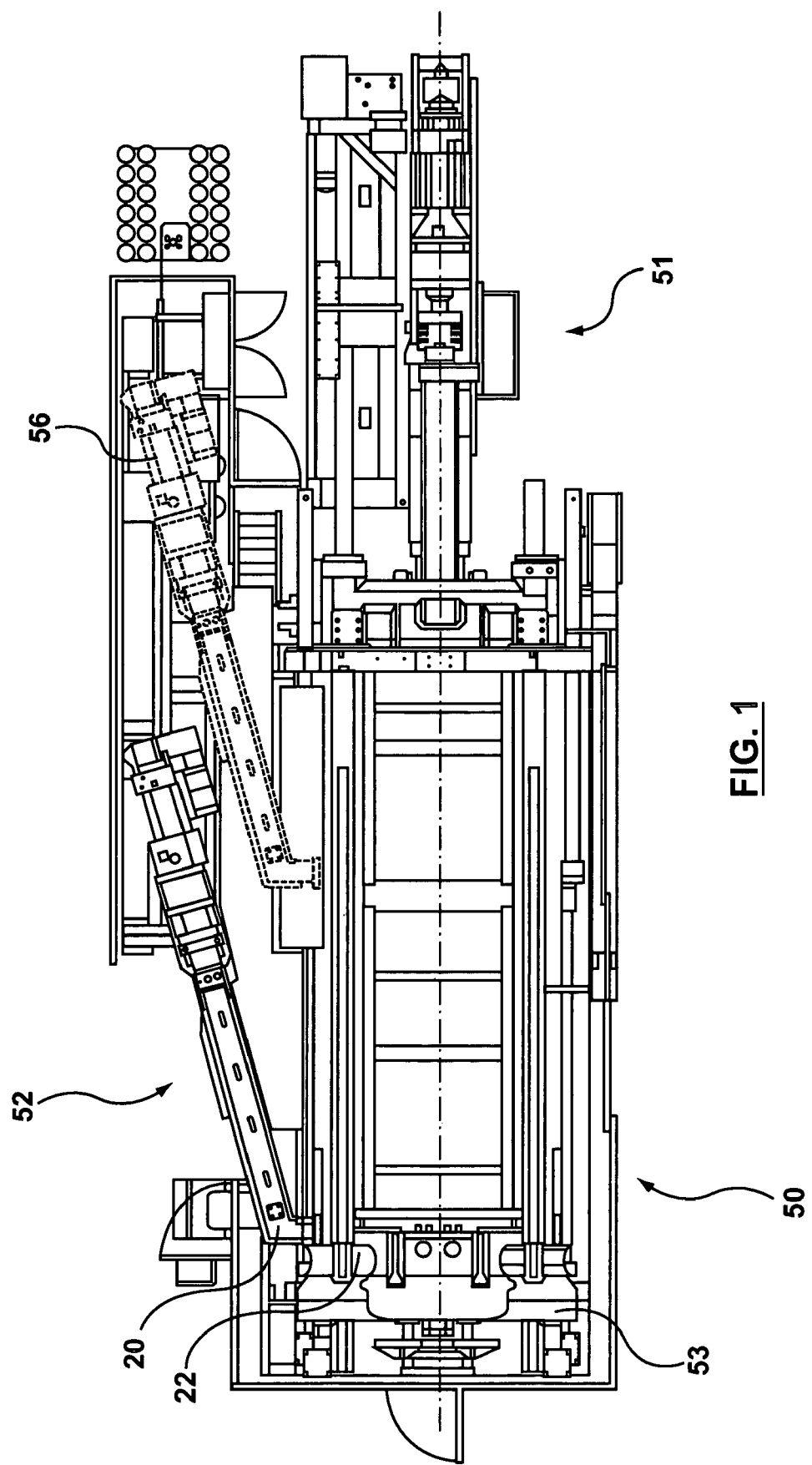
FIG. 1 is a schematic plan view of a multi-material injection molding machine according to a preferred embodiment according to the present invention.
Figures 2, 3:
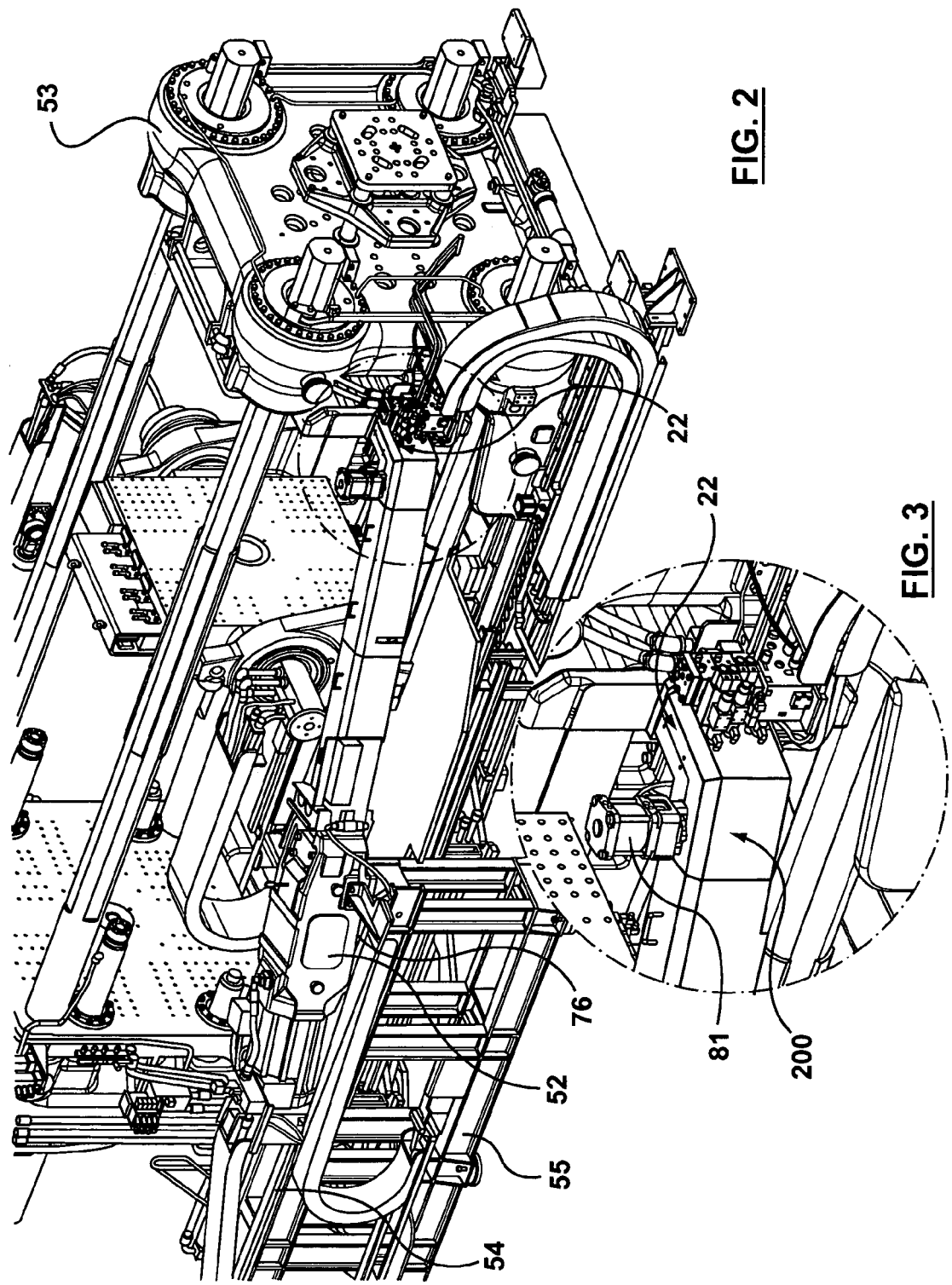
FIG. 2 is a perspective view of the multi-material injection molding machine according to a preferred embodiment according to the present invention.
FIG. 3 is a close-up perspective view of the articulated joint location according to a preferred embodiment according to the present invention.
Figure 4:
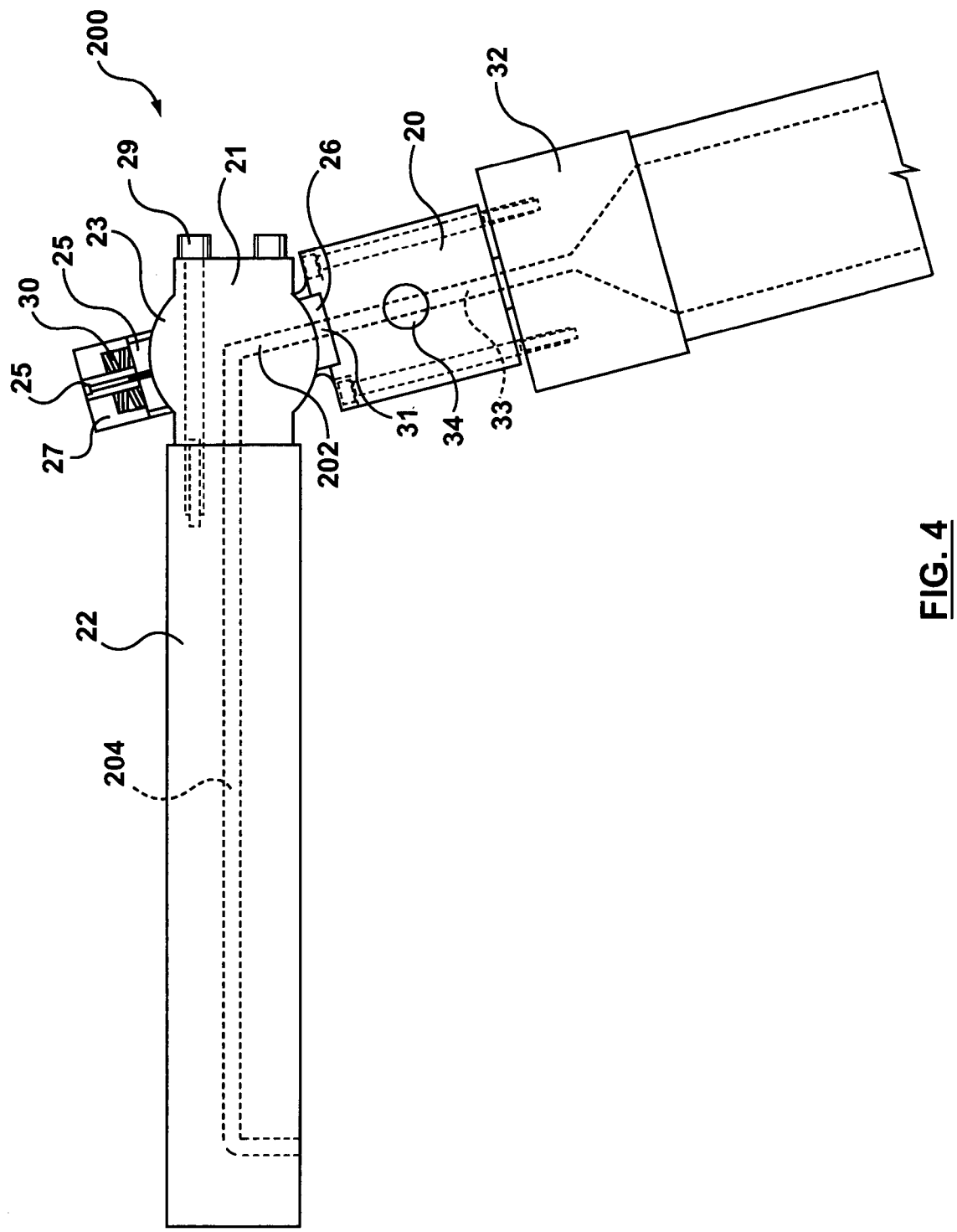
FIG. 4 is a schematic plan view of the hot runner-injection unit connection assembly of the FIG. 1 embodiment.
Figure 5:
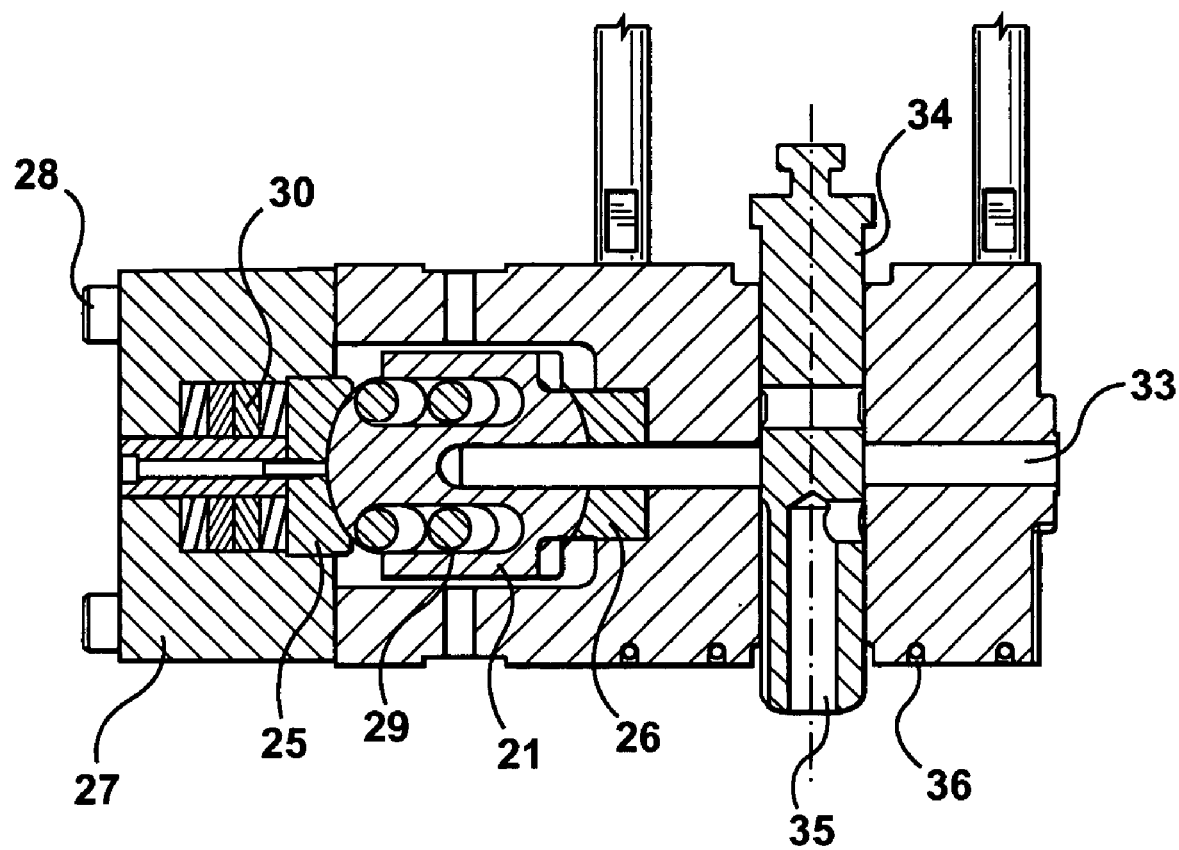
FIG. 5 is a cross section view of the distributor block and hot runner extension of the FIG. 1 embodiment.
Figure 6:
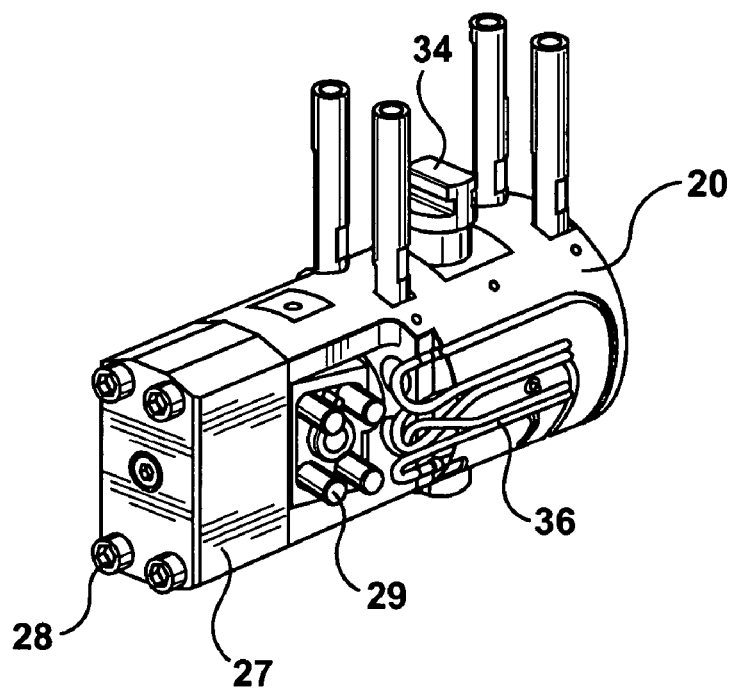
FIG. 6 is an isometric view of the distributor block and hot runner extension of the FIG. 1 embodiment.
Figure 7:
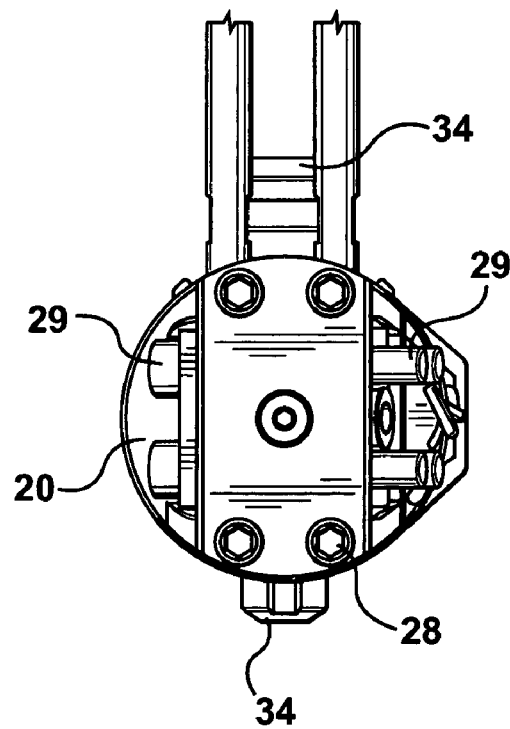
FIG. 7 is an end view of the distributor block of the FIG. 1 embodiment.
Figure 8:
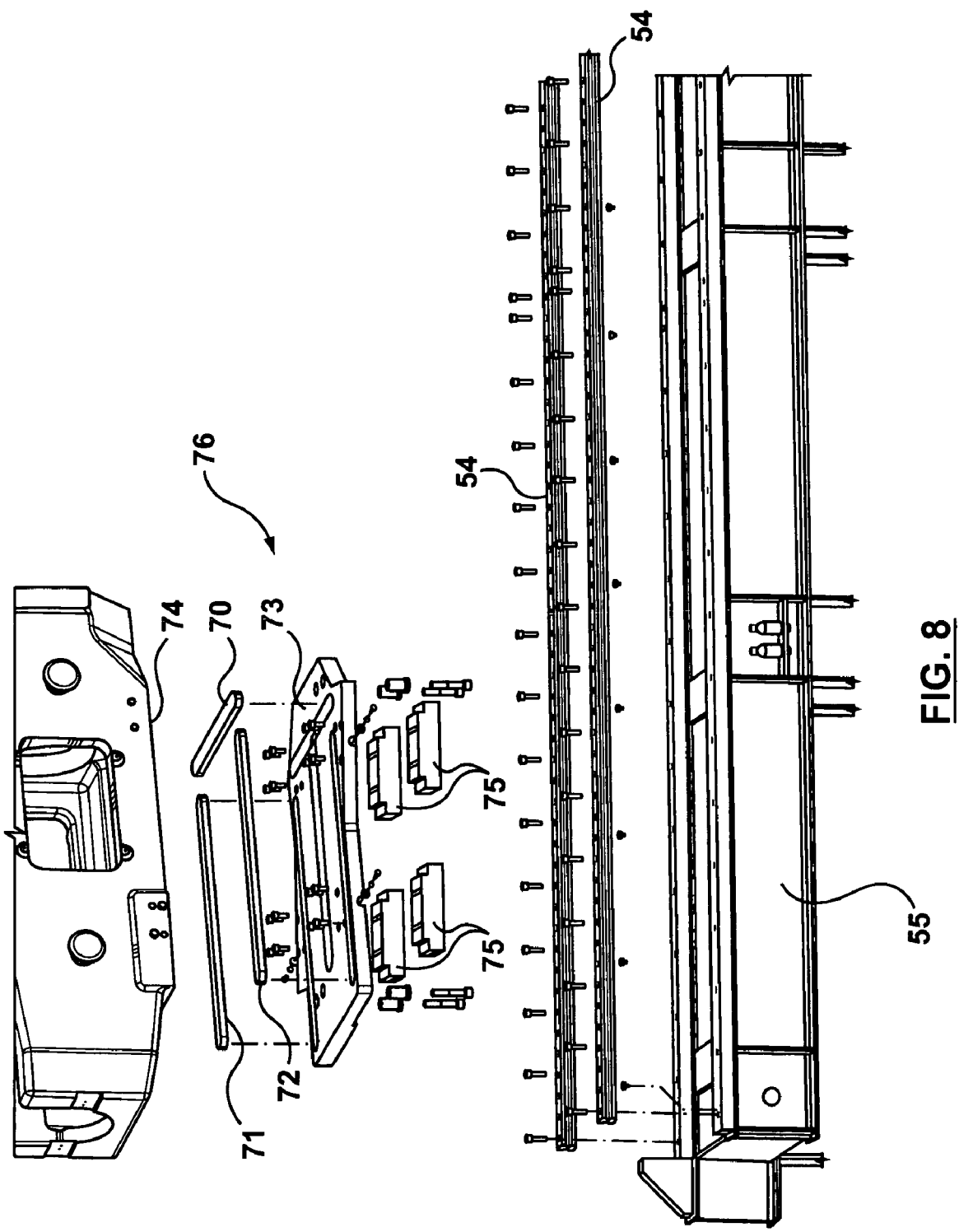
FIG. 8 is an exploded isometric view of the second injection unit mounting, of the FIG. 1 embodiment.

FIGS. 1-3 are schematic and perspective views of a multi-material injection molding machine comprising a clamp unit 50, a first injection unit 51, and a second injection unit 52. The second injection unit 52 is bolted to a distributor block 20 that is bolted to a hot runner 22 that is, in turn, attached to the moving platen 53. FIGS. 2 and 8 shows that the second injection unit 52 is mounted on a carriage assembly 76 that includes a subplate 73 that rides on four linear bearings 75. The linear bearings 75 are mounted on linear rails 54 that are attached to the second injection unit base 55. As the moving platen 53 moves from its mold open position (as shown in FIG. 1) to its mold closed position, it moves the second injection unit 52 along with it. The mold closed position for second injection unit is shown at 56 of FIG. 1. Consequently, the connection between the second injection unit 52, the distributor block 20, and the hot runner 22 must be robust enough to transmit these forces of motion while accommodating any variations in alignment between the track of the moving platen 53 and the linear rails 54 that may be caused by thermal expansions or misalignments.

FIG. 8 shows rectangularly-arrayed flexible pads 70, 71 and 72 that are positioned between the subplate 73 and the bottom surface 74 of the second injection unit 52 such that small variations in position and alignment between the second injection unit 52 and the movable platen 53 (containing the hot runner 22) are accommodated, thereby minimizing stress and wear on the second injection unit's carriage assembly 76, the linear rails 54, and the connection to the hot runner. Preferably, each of the flexible pads is made of polyurethane, and is 850 mm long, 65 mm wide, and 25 mm thick. Of course other materials and configurations may be provided, such as any rubber, any flexible plastic material, or any kind of steel spring connection. Of course, one or more flexible pads may be provided in any desired configuration(s) and designed to absorb the shock and vibrations caused by the movement of the second injection unit. This structure is described in more detail in copending U.S. patent application Ser. No. 10/966,710 entitled INJECTION MOLDING COUPLING APPARATUS AND METHOD OF COUPLING.

FIGS. 4-7 show the distributor block 20, that is preferably bolted to the end of the hot runner 22 with a movable, articulated sealed connection 200. Preferably, the movable sealed connection 200 comprises a hot runner extension 21 bolted to the hot runner 22 with bolts 29, a hot runner extension melt channel 202, and has opposed spherical surfaces 23 and 24. These spherical surfaces 23 and 24 are configured so as to mate with concave pads 25 and 26 that are, respectively, disposed between a cap 27 (that is bolted to the distributor block 20 with screws 28) and the distributor block 20. Preferably, each of the concave pads is made of H13 steel, and is 80 mm in diameter, and 40 mm thick. Of course other materials and configurations may be provided, such as ceramic and any steel or copper alloys. The pads may be bolted to their seat or just be held by compression force from the spring package. Preferably, each of the spherical surfaces 23, 24 is made of H13 steel, and comprises a hemispherical shape having a diameter of 120 mm. Of course, other flexible connections such as an interface part of cylindrical shape or melt channel connection with a "thin" wall tubing may be provided to ensure a movable yet sealable connection between the hot runner 22 and the injection unit barrel head 32.

A spring pack 30 is disposed to urge the concave pad 25 to press the hot runner extension 21 against the concave pad 26, thereby maintaining a good seal at the interface of the concave pad melt channel 31, which passes through the concave pad 26. The molten material thus moves from the injection unit barrel head 32, through the distributor block melt channel 33, through the concave pad melt channel 31, through the hot runner extension melt channel 202, and into the hot runner melt channel 204.

A three position shut off valve plunger 34 is mounted in the distributor block 20 and is configured to allow the material (i) to pass through the valve, (ii) to be blocked by the valve, or (iii) to be diverted to a purging channel 35, depending upon the plunger's position. See FIG. 5. The three position shut off valve assembly is the subject of copending U.S. patent application Ser. No. 10/966,715 entitled INJECTION MOLDING THREE-WAY SHUT OFF VALVE AND METHOD, and is described therein. In FIG. 3, the housing of a first cylinder 81 of a first piston 80 for controlling the three way shut off valve is shown.

The distributor block 20 is heated conventionally with tubular heaters 36, or the like. The distributor block 20 is bolted to the injection unit barrel head 32 such that variations in the geometric relationship between the injection unit barrel head 32 and the hot runner 22 (caused by thermal expansion or movement during the opening and closing strokes of the machine) are accommodated by the sealing connection between the spherical surfaces 23 and 24 and the concave pads 25 and 26 of the interface.

3. The Operation of the Preferred Embodiment

In operation, as the second injection unit 52 moves together with the moving platen 53, the connection between the injection unit barrel head 32 and the hot runner 22 will move slightly, causing the distributor block 20 to rotate in any direction with respect to the hot runner 22. The concave pads 25 and 26 will move with respect to their corresponding spherical surfaces 23 and 24 to accommodate this movement. Furthermore, while the second injection unit 52 is moved along rails 54, the flexible pads 70-72 will absorb any misalignment caused by this movement.

4. Conclusion

Advantageous features according to the present invention may include:

The self aligning sealing feature of the hot runner-distributor block connection has a novel configuration.

The method of using the self aligning articulated coupling in an injection molding machine is novel.

Thus, what has been described is a method and apparatus for providing a self-aligning articulated injection molding coupling which allows the melt to be transmitted between the injection unit and the hot runner system in a movable mold component.

The individual components shown in outline or designated by blocks in the attached Drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. patent documents discussed above are hereby incorporated by reference into the Detailed Description of the Preferred Embodiment.

What is claimed is:

1. An injection molding hot runner system, comprising:
   a hot runner;
   an articulated joint;
   said articulated joint being disposed with the hot runner and configured to permit movement therebetween, said articulated joint comprising:
   a melt channel configured to provide a melt to the hot runner;
   a first spherical surface in contact with a first concave pad; and
   a second spherical surface in contact with a second concave pad, one of the spherical surfaces being configured to be coupled to the hot runner, and the concave pads being configured to be coupled to an injection unit and wherein said injection unit is configured to move with respect to rails, and further comprising a plurality of flexible pads (i) configured to be disposed between said injection unit and the rails, and (ii) configured to avoid overloading and damage on a second injection unit and the rails caused by misalignment due to thermal elongation of heated components and/or incorrect setup/leveling.

2. An injection molding hot runner system according to claim 1, further comprising a distributor block configured to be coupled between an injection unit and the articulated joint.

3. An injection molding hot runner system according to claim 2, wherein said distributor block is bolted to said injection unit, and wherein said articulated joint is bolted to the hot runner.

4. An injection molding hot runner system according to claim 3, wherein said distributor block has a melt channel therein in fluid communication with the injection unit, and wherein the first concave pad is coupled to said distributor block, and wherein the first concave pad has a melt channel therein in fluid communication with both the distributor block melt channel and the articulated joint melt channel.

5. An injection molding hot runner system according to claim 4, further comprising structure configured to press the first and second concave pads against the first and second spherical surfaces, respectively.

6. An injection molding hot inner system according to claim 5, wherein said structure comprises a spring device coupled to an end of said distributor block.

7. An injection molding articulated joint coupling an injection unit and a hot runner, said articulated joint comprising:
   a joint having first and second spherical surfaces and a melt channel therein, said joint being coupled to one of the injection unit and the hot runner; and
   first and second concave members respectively in contact with said first and second spherical surfaces and configured to be movable with respect thereto, at least one of said first and second concave members being coupled to the other one of the injection unit and the hot runner and wherein said injection unit is configured to move with respect to rails, and further comprising a plurality of flexible pads (i) configured to be disposed between said injection unit and the rails, and (ii) configured to avoid overloading and damage on a second injection unit and the rails caused by misalignment due to thermal elongation of heated components and/or incorrect setup/leveling.

\* \* \* \* \*